Nov. 14, 1933.    F. C. RABER    1,935,414
MOTOR VEHICLE BRAKING DEVICE
Filed March 23, 1931    2 Sheets-Sheet 1

INVENTOR
FRANKLIN C. RABER
BY
ATTORNEY

Nov. 14, 1933.   F. C. RABER   1,935,414
MOTOR VEHICLE BRAKING DEVICE
Filed March 23, 1931   2 Sheets-Sheet 2
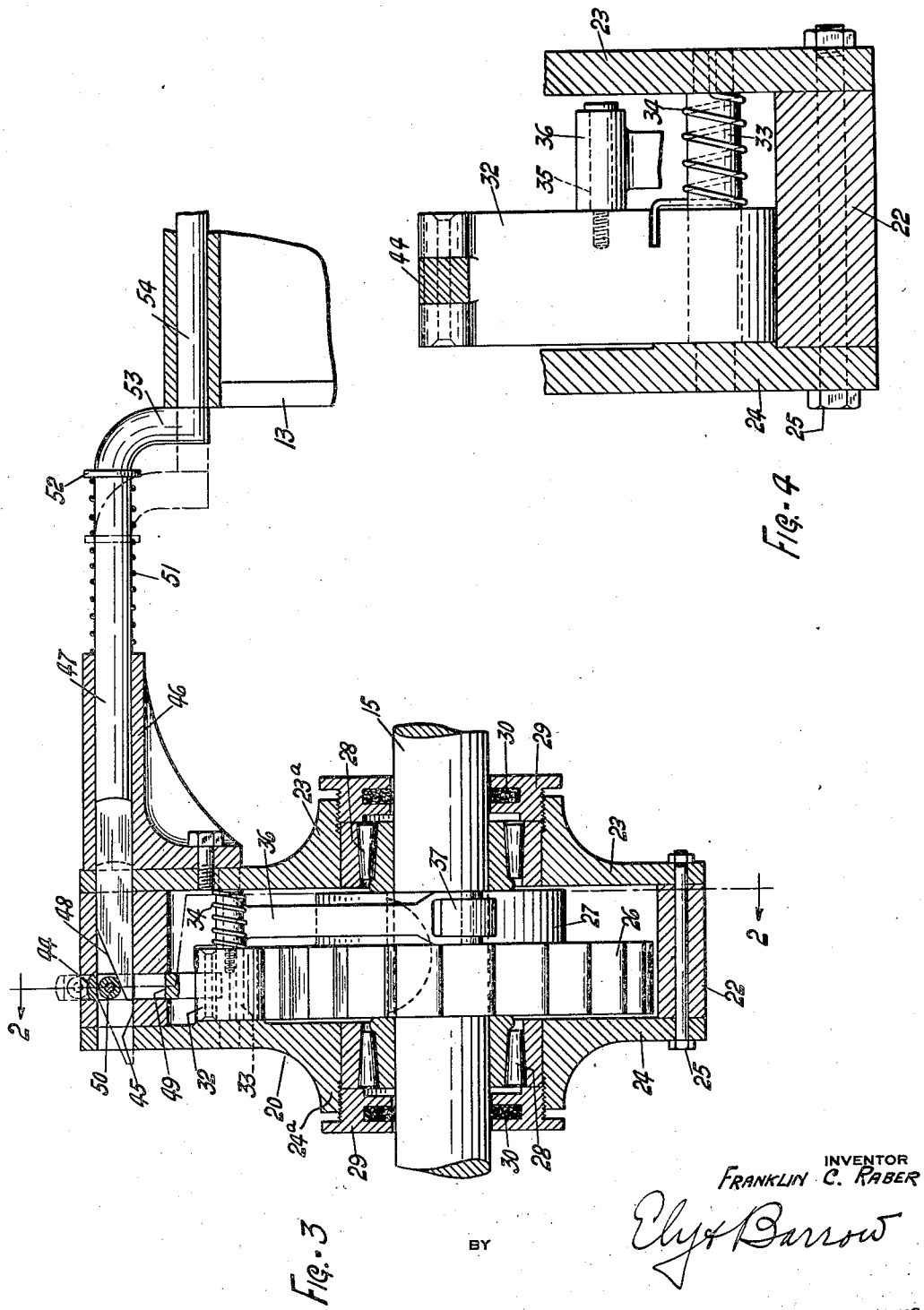

Patented Nov. 14, 1933

1,935,414

UNITED STATES PATENT OFFICE 1,935,414

MOTOR VEHICLE BRAKING DEVICE

Franklin C. Raber, Akron, Ohio

Application March 23, 1931. Serial No. 524,504

11 Claims. (Cl. 192—4)

This invention relates to braking devices for use on motor propelled vehicles, and more especially it relates to devices which automatically prevent retrograde movement of the vehicle when the driving means thereof is inoperative, either because the clutch is disengaged or the gear-shift lever is in neutral position, and yet permit the vehicle to be driven backward by means of its reverse gear.

The chief objects of the invention are automatically and positively to prevent backward movement of the vehicle except when reversely driven by the engine; to provide a simple and effective device for accomplishing the foregoing object; and to provide for quietness of operation in such a device. A further object is to avoid the dangerous situations present when an automobile stalls or is parked on an upgrade.

Of the accompanying drawings:

Figure 3 is a section on the line 3—3 of Figure 2; and

Figure 4 is a section on the line 4—4 of Figure 2.

In general the invention comprises ratchet and pawl mechanism associated with the drive shaft of an automobile, and so constructed and arranged that the pawl automatically is engaged or disengaged from the ratchet according to the direction of rotation of the drive shaft, including means for disengaging the pawl from the ratchet when the gear-shift lever is in reverse driving position.

Figure 1:
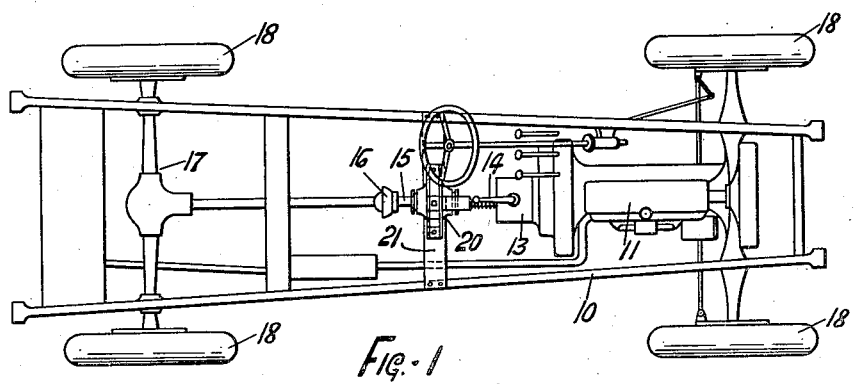
Figure 1 is a plan view of the chassis of an automobile, and the improved braking device, in its preferred form, associated with the drive shaft thereof.

Referring to Figure 1 of the drawings, 10 is the frame of a motor vehicle of the passenger type, 11 is the motor or engine thereof, 13 is the transmission housing, 14 is the gear-shift lever, 15 is the drive shaft, 16 is the universal joint, 17 is the rear axle assembly, and 18, 18 are the respective wheels of the vehicle. The improved braking device, generally designated 20, is mounted upon a suitable transverse support 21 between the transmission housing 13 and the universal joint 16, the drive shaft 15 extending through the device.

The braking device 20 comprises an annular housing 22 that is bolted to the support 21, and cover plates 23, 24 that are secured respectively to the front and rear of the housing by bolts 25 or the like. Keyed to the drive shaft 15, within the housing 22, is a ratchet 26 that has an axially extending hub portion 27 of reduced diameter, although the member 27 may be a separate piece if desired. The cover plates 23, 24 are formed with respective axial bosses 23ª, 24ª in which are mounted thrust bearings 28, 28 which constitute additional supports for the shaft 15, and also serve as a means for centering the ratchet laterally of the housing. Nuts or glands 29, 29 are threaded into the respective axial bosses 23ª, 24ª for retaining the bearings 28 therein, and each of said nuts is provided with an annular packing 30 that embraces the shaft 15 to prevent the escape of lubricant from the braking device. The housing is provided with a grease-gun connection 31 through which lubricant may be forced into its interior.

A pawl 32 is pivotally mounted within the housing 22 at the top thereof, upon a rod 33 that is supported at its ends by the respective cover plates 23, 24. The pawl 32 is adapted to engage the teeth of the ratchet 26, the arrangement being such that when the pawl and ratchet are engaged retrogressive movement of the vehicle is prevented. Preferably the housing structure fits closely against the pivoted end of the pawl so that the rod 33 is relieved of strain incidental to braking. A torsion spring 34 is mounted upon the rod 33 and has its respective ends engaging the pawl and the front cover plate, the spring being so arranged as yieldingly to urge the pawl lightly toward ratchet-engaging position.

Pivotally attached at 35 to one side of the pawl 32 is a depending link 36 that has its opposite end forked, and has a roller 37 journaled in said fork, said link being so positioned that the roller 37 rests against the hub portion 27 of the ratchet 26. The roller 37 is normally urged against the hub 27 by an arcuate plate 38 that is pivotally mounted at its upper end in a boss or ear 39 that is formed on the inner periphery of the housing 22, radially of the hub 27. The lower end portion of the plate 38, below the roller 37, is apertured at 40, and a stud 41 extends through said aperture and has a threaded portion that extends through the wall of the housing 22 so as to permit the stud to be rotated from outside the housing to effect axial adjustment of the stud. A compression spring 42 is mounted upon the stud 41 between the housing wall and the plate 38 so as normally to urge the latter against the roller 37, and the inner end of the stud 41 has an enlarged head or flange 41ª to limit the movement of the plate 38 under the impetus of the spring 42, upon occasion, as when the apparatus is being assembled or taken apart.

In order that the pawl 32 may be removed automatically from engagement with the ratchet 26 when the vehicle is reversely driven by the engine, a link 44 is pivotally connected to the free end portion of the pawl 32 and extends upwardly through the wall of the housing 22 at the top thereof, said link being slidable in the housing wall. The slideway of the link 44 transects a rectangular aperture or slideway 45 formed in the housing 22 and cover plates 23, 24, said slideway extending through the device from front to rear. A bracket 46 mounted upon the front cover plate 23 has formed therein a continuation of the slideway 45 that is circular in section to receive a cylindrical cam rod 47, the rear end of which is rectangular in section to fit the slideway 45. The rear end of the cam rod 47 is beveled or tapered at 48 to constitute a cam, the end of which extends into a longitudinal slot 49 formed in the link 44 and engages a cam roller 50 journaled therein.

The cam rod 47 normally is urged toward the front, in which position the cam 48 is substantially withdrawn from the slot 49, by means of a compression spring 51 that is mounted upon the cam rod between a collar 52 thereon and the front end of the bracket 46. The front end of the cam rod is angularly bent to provide an offset portion 53 that is positioned adjacent the transmission housing 13 in front of the end of reverse gear-shift rod 54 that extends through said housing, said rod 54 being normally position as shown in full lines in Figure 3, but assuming the broken line position when the reverse gear is in mesh for reverse driving.

Figure 2:
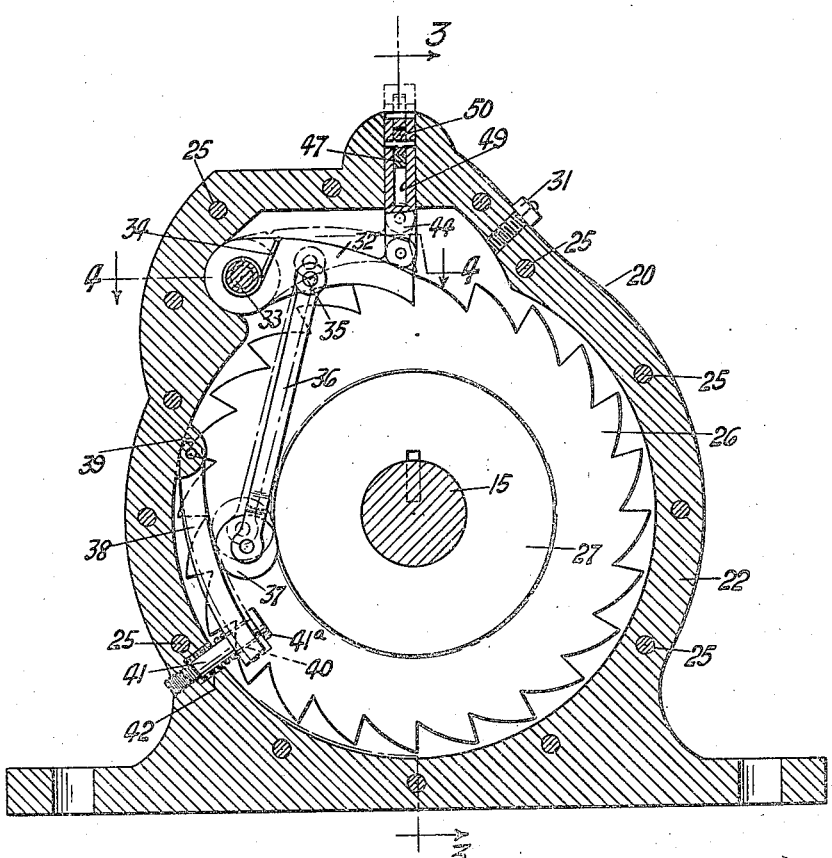
Figure 2 is a vertical section through the braking device taken on the line 2—2 of Figure 3.

The operation of the device is as follows:

Assuming the parts to be in braking position as shown in full lines in Figure 2, the vehicle may be driven forward in the usual manner, the ratchet 26 thereby being driven in clockwise direction with the result that the pawl 32 is lifted by the teeth of the ratchet, and then raised above said teeth by the action of the hub member 27 upon the roller 37 which results in the lifting of the link 36 upwardly as is shown in broken lines in Figure 2. The respective members retain the positions described when the vehicle is moving forward or is stationary, the spring-pressed plate 38 holding the roller 37 against retrogressive movement when the car is stationary. If, however, the vehicle starts to drift or move backward, the counter-clockwise movement of the ratchet hub 27 against the roller 37 causes the link 36 to be drawn downwardly whereby the free end of the pawl 32 is brought into the path of the ratchet teeth and engaged thereby as is shown in full lines in Figure 2. The torsion spring 34 assists the link 36 in moving the pawl downwardly into latching position. In either operation of raising or lowering the pawl, power is imparted to the link 36 by reason of the differential friction on the opposite sides of the roller 37, that is, there is sliding friction between the roller 37 and the plate 38 whereas the friction between the roller and the hub 27 is rolling friction. Thus the roller moves longitudinally of the plate 38 when rotated by the hub 27.

When the vehicle is to be reversely driven by the engine, the moving of the gear-shift lever 14 into "reverse" position causes the rod 54 to be moved rearwardly to the position shown in broken lines in Figure 3, with the result that the cam rod 47 is moved rearwardly against the pressure of the spring 51, and the cam face 47, by moving under the roller 50 as shown, either lifts the link 44 or secures it in lifted position whereby the pawl 32 positively is held out of engagement with the ratchet 26.

The device is positive and automatic in its action. It is simple in construction and easily may be designed to fit any make of vehicle. Also the device is noiseless in operation since the pawl is positively held out of engagement with the ratchet except at such times as the vehicle is moving backward and not in reverse gear.

The device may be variously modified within the scope of the appended claims which are not limited wholly to the specific construction shown and described.

What is claimed is:

1. In a motor vehicle braking device, the combination of a drive shaft for driving the vehicle in two directions, a ratchet mounted on said drive shaft, a pawl associated with said ratchet mounted upon a stationary member, an operating link pivotally connected to said pawl, a roller journaled in the free end of said link, and means for applying differential friction to opposite sides of said roller to cause longitudinal movement of the link for moving the pawl into or out of engagement with the ratchet.

2. A combination as defined in claim 1 in which rolling friction is applied to one side of the pawl-link roller and sliding friction to its other side.

3. In a device of the character described, the combination of a drive shaft for driving a vehicle in two directions, a ratchet mounted on said drive shaft, a pawl associated with said ratchet, an operating link connected at one end to said pawl, a roller journaled in the opposite end of said link, a rotary member associated with the drive shaft, and a member frictionally engaging said roller and urging it against said rotary member.

4. A combination as defined in claim 3 in which the member that frictionally engages the roller is a pivotally mounted plate, including yielding means for urging the plate against the roller.

5. In a device of the character described, the combination of a drive shaft for driving a vehicle in two directions, a ratchet mounted upon said drive shaft, a pawl associated with said ratchet, a link connected to said pawl, means for effecting longitudinal movement of said link to engage or disengage the pawl from the ratchet, a second link connected to the pawl, and means for longitudinally moving the second link automatically to disengage the pawl from the ratchet when the vehicle is placed in reverse gear.

6. A combination as defined in claim 5 in which the means for moving the second link comprises a cam.

7. A combination as defined in claim 5 in which the means for reciprocating the first mentioned link operates through friction therewith.

8. In a device of the character described, the combination of a drive shaft for driving a vehicle in two directions, a ratchet mounted upon said drive shaft, a pawl associated with said ratchet, a link connected to said pawl, means controlled by movement of the drive shaft for effecting longitudinal movement of said link to engage or disengage the pawl from the ratchet, a second link connected to the pawl, and means for moving the second link to disengage the pawl from the ratchet.

9. In a device of the character described, the combination of drive means for driving a vehicle in two directions, a toothed member on said drive means, a device arranged to move into and out of operative relation with said toothed member, to prevent its rotation in one direction, an operating link pivotally connected to said device, a roller journaled in the free end of said link, and means for moving the roller over a stationary surface to effect operative movement of said link.

10. In a device of the character described, the combination of a drive shaft for driving a vehicle in two directions, a toothed member on said drive shaft, a member arranged to move into and out of operative relation with said toothed member, to prevent its rotation in one direction, an operating link connected to said last mentioned member, a roller journaled in the free end of said link, and means controlled by movement of the driven shaft for applying differential friction to opposite sides of said roller to effect operative movement of said link.

11. In a device of the character described, a rotatable shaft, a ratchet on said shaft, a pawl associated with said ratchet, yielding means normally urging the pawl toward the ratchet, a link pivotally connected to said pawl for moving it out of engagement with said ratchet, a roller journaled in the free end of said link, and means for driving the roller, against a stationary surface, to effect longitudinal movement of said link.

FRANKLIN C. RABER.